United States Patent
Chapagain et al.

(10) Patent No.: US 10,612,657 B2
(45) Date of Patent: Apr. 7, 2020

(54) SPACE PLATE WITH SEAL FOR JOINT ASSEMBLY

(71) Applicant: Caterpillar Inc., Peoria, IL (US)

(72) Inventors: Pradeep Chapagain, Peoria Heights, IL (US); Sunil I. Mathew, Peoria, IL (US); Charles Taylor Hudson, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 668 days.

(21) Appl. No.: 15/235,816

(22) Filed: Aug. 12, 2016

(65) Prior Publication Data

US 2017/0074306 A1     Mar. 16, 2017

Related U.S. Application Data

(60) Provisional application No. 62/218,392, filed on Sep. 14, 2015.

(51) Int. Cl.
| | |
|---|---|
| *F16B 43/00* | (2006.01) |
| *F16J 15/02* | (2006.01) |
| *F16D 1/08* | (2006.01) |
| *F16J 15/12* | (2006.01) |

(52) U.S. Cl.
CPC ........... *F16J 15/021* (2013.01); *F16B 43/001* (2013.01); *F16D 1/0864* (2013.01); *F16J 15/127* (2013.01); *Y10T 403/52* (2015.01)

(58) Field of Classification Search
CPC ........ F16J 15/021; F16J 15/127; F16J 15/122; F16J 2015/0856; F16J 15/123; F16D 1/0864; F16B 43/001; Y10T 403/52
See application file for complete search history.

(56) References Cited

U.S. PATENT DOCUMENTS

| | | | | |
|---|---|---|---|---|
| 1,986,465 | A | * | 1/1935 | Dempsey ................. F02F 11/00 277/632 |
| 2,722,043 | A | * | 11/1955 | Nenzell ................. E04B 1/6812 49/479.1 |
| 3,135,540 | A | | 6/1964 | Herbenar |
| 3,175,832 | A | * | 3/1965 | Carrell .................... F16J 15/067 277/632 |
| 3,231,289 | A | * | 1/1966 | Carrell .................... F16J 15/067 277/632 |

(Continued)

FOREIGN PATENT DOCUMENTS

| | | |
|---|---|---|
| CN | 103249975 | 8/2013 |
| CN | 103334992 | 10/2013 |

(Continued)

*Primary Examiner* — Matthew R McMahon
(74) *Attorney, Agent, or Firm* — Leydig, Voit & Mayer, Ltd.

(57) ABSTRACT

A joint assembly includes a clamp member and a spacer plate. The clamp member includes a first jaw surface and a second jaw surface that define a gap therebetween. The spacer plate is connected to the clamp member such that the spacer plate is disposed within the gap between the first jaw surface and the second jaw surface. The spacer plate includes a body and a seal member. The body includes a perimeter. The seal member is connected to the body such that it is disposed adjacent the perimeter of the body. The seal member extends over a segment of the perimeter of the body. The seal member is in sealing engagement with the first jaw surface and the second jaw surface.

18 Claims, 9 Drawing Sheets

(56) References Cited

U.S. PATENT DOCUMENTS

| | | | | |
|---|---|---|---|---|
| 3,612,538 A * | 10/1971 | Sievenpiper | | F16J 9/06 |
| | | | | 277/468 |
| 4,026,565 A * | 5/1977 | Jelinek | | F16J 15/121 |
| | | | | 277/639 |
| 4,195,862 A | 4/1980 | Specktor et al. | | |
| 4,754,982 A * | 7/1988 | Udagawa | | F16J 15/123 |
| | | | | 277/596 |
| 5,149,109 A * | 9/1992 | Jelinek | | F16J 15/067 |
| | | | | 277/632 |
| 5,236,203 A * | 8/1993 | Uchida | | F01M 11/0004 |
| | | | | 277/591 |
| 5,267,740 A * | 12/1993 | Stritzke | | F16J 15/0818 |
| | | | | 277/316 |
| 5,482,400 A * | 1/1996 | Bavington | | E02D 29/12 |
| | | | | 404/25 |
| 5,618,047 A * | 4/1997 | Belter | | B29C 45/26 |
| | | | | 277/632 |
| 5,975,547 A | 11/1999 | Stroh et al. | | |
| 6,371,489 B1 * | 4/2002 | Combet | | F16J 15/0825 |
| | | | | 277/594 |
| 6,536,775 B1 * | 3/2003 | Inciong | | F16J 15/123 |
| | | | | 277/596 |
| 6,553,664 B1 * | 4/2003 | Schenk | | F16J 15/067 |
| | | | | 29/460 |
| 7,059,612 B2 * | 6/2006 | Kuribayashi | | F16B 43/001 |
| | | | | 277/637 |
| 7,063,327 B2 * | 6/2006 | Salameh | | F16J 15/064 |
| | | | | 277/590 |
| 7,347,176 B1 * | 3/2008 | Estacio | | F02F 11/00 |
| | | | | 123/195 R |
| 7,681,890 B2 * | 3/2010 | Griffin | | F16J 15/061 |
| | | | | 277/592 |
| 7,740,969 B2 * | 6/2010 | Inoue | | F16J 15/0818 |
| | | | | 429/518 |
| 7,749,635 B2 * | 7/2010 | Kuroki | | F16J 15/0818 |
| | | | | 277/650 |
| 7,832,765 B2 | 11/2010 | Park | | |
| 8,833,771 B2 * | 9/2014 | Lesnau, IV | | F16J 15/061 |
| | | | | 277/591 |
| 2004/0262874 A1 | 12/2004 | Lorente | | |
| 2005/0134008 A1 * | 6/2005 | Salameh | | F16J 15/062 |
| | | | | 277/628 |
| 2005/0218642 A1 | 10/2005 | Yamaguchi et al. | | |
| 2007/0262537 A1 * | 11/2007 | Klinner | | F16J 15/0818 |
| | | | | 277/594 |
| 2008/0284112 A1 * | 11/2008 | Koch | | F16J 15/104 |
| | | | | 277/590 |
| 2009/0301637 A1 | 12/2009 | Reichert | | |
| 2011/0072634 A1 * | 3/2011 | Kamibayashiyama | | F16J 15/061 |
| | | | | 29/446 |
| 2013/0249173 A1 * | 9/2013 | Yamamoto | | F16J 15/024 |
| | | | | 277/639 |
| 2015/0285381 A1 * | 10/2015 | Preston | | F16L 23/18 |
| | | | | 277/612 |

FOREIGN PATENT DOCUMENTS

| | | |
|---|---|---|
| CN | 204399277 | 6/2015 |
| DE | 102004017064 | 10/2004 |
| WO | WO 2010/133406 A1 | 11/2010 |

* cited by examiner

SPACE PLATE WITH SEAL FOR JOINT ASSEMBLY

CROSS-REFERENCE TO RELATED APPLICATION

This patent application claims the benefit of priority to U.S. Patent Application No. 62/218,392, filed Sep. 14, 2015, and entitled "Spacer Plate With Seal for Joint Assembly," which application is incorporated in its entirety herein by this reference.

TECHNICAL FIELD

This patent disclosure relates generally to a spacer plate with a seal and, more particularly, to a spacer plate with a seal for use in a joint assembly.

BACKGROUND

A joint assembly can be used in a variety of applications to secure a first member to a second member. An example of such an application is a pin secured to a pitman arm yoke. In some instances, a shim may be inserted between the jaws of the yoke to facilitate the secure coupling between the pin and the yoke without causing excessive forces within the yoke and/or misalignment of the bores within the jaws of the yoke. Under such circumstances, a gap may be defined between the shim and one or more jaws of the yoke that provides an entry path for dirt and debris. Over time, any dirt and debris that works its way into the joint can cause pin wear, leading to a loss in functionality and/or useful life of the pin.

U.S. Pat. No. 4,195,862 is entitled, "Camber Adjusting Shim Arrangement," and is directed to a shim arrangement for adjusting the camber of a wheel in a steerable driving axle assembly, such as a front axle assembly of a four wheel drive vehicle. The shim arrangement involves a large number of tapered shims of resilient non-metallic material of high compressive strength at yield, each of which has a different maximum dimension and each of which preferably has a color corresponding to the maximum dimension of the shim. In use, a shim of the required thickness is inserted between two sections of the axle housing to adjust the angle between them and hence the camber of the wheel. Because the shims are colored, it is possible to identify the particular shim that has been used after the axle assembly has been reassembled after insertion of the shim. The shims are of a resilient plastic material such as 40% glass filled nylon. Each shim preferably has an annular rib adjacent its inner wall which engages the adjacent surfaces of the housing, or an adjacent shim, and acts as a seal.

There is a continued need in the art to provide additional solutions to enhance the performance of joint assemblies. For example, there is a continued need for a joint assembly including a pin and a pitman arm which helps prevent the pin from being affected by the entry of dirt and debris into the joint, preferably without the use of grease or other lubricant.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a spacer plate that includes a body and a seal member. The body includes a perimeter and is made from a body material. The seal member is connected to the body. The seal member is disposed adjacent the perimeter of the body and extends over a segment of the perimeter of the body. The seal member is made from a seal member material. The body material is harder than the seal member material.

In yet another embodiment, a spacer plate includes a body and a seal member. The body includes a perimeter, a first face, and a second face. The second face is in opposing relationship to the first face. The seal member is connected to the body. The seal member extends over at least a segment of the perimeter of the body. The seal member includes a first bead and a second bead. The first bead and the second bead respectively project from the first face and the second face of the body.

In still another embodiment, a joint assembly includes a clamp member and a spacer plate. The clamp member includes a first jaw surface and a second jaw surface that define a gap therebetween. The spacer plate is connected to the clamp member such that the spacer plate is disposed within the gap between the first jaw surface and the second jaw surface. The spacer plate includes a body and a seal member. The body includes a perimeter. The seal member is connected to the body such that it is disposed adjacent the perimeter of the body. The seal member extends over a segment of the perimeter of the body. The seal member is in sealing engagement with the first jaw surface and the second jaw surface.

Further and alternative aspects and features of the disclosed principles will be appreciated from the following detailed description and the accompanying drawings. As will be appreciated, the principles related to spacer plates and joint assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

Figure 1:
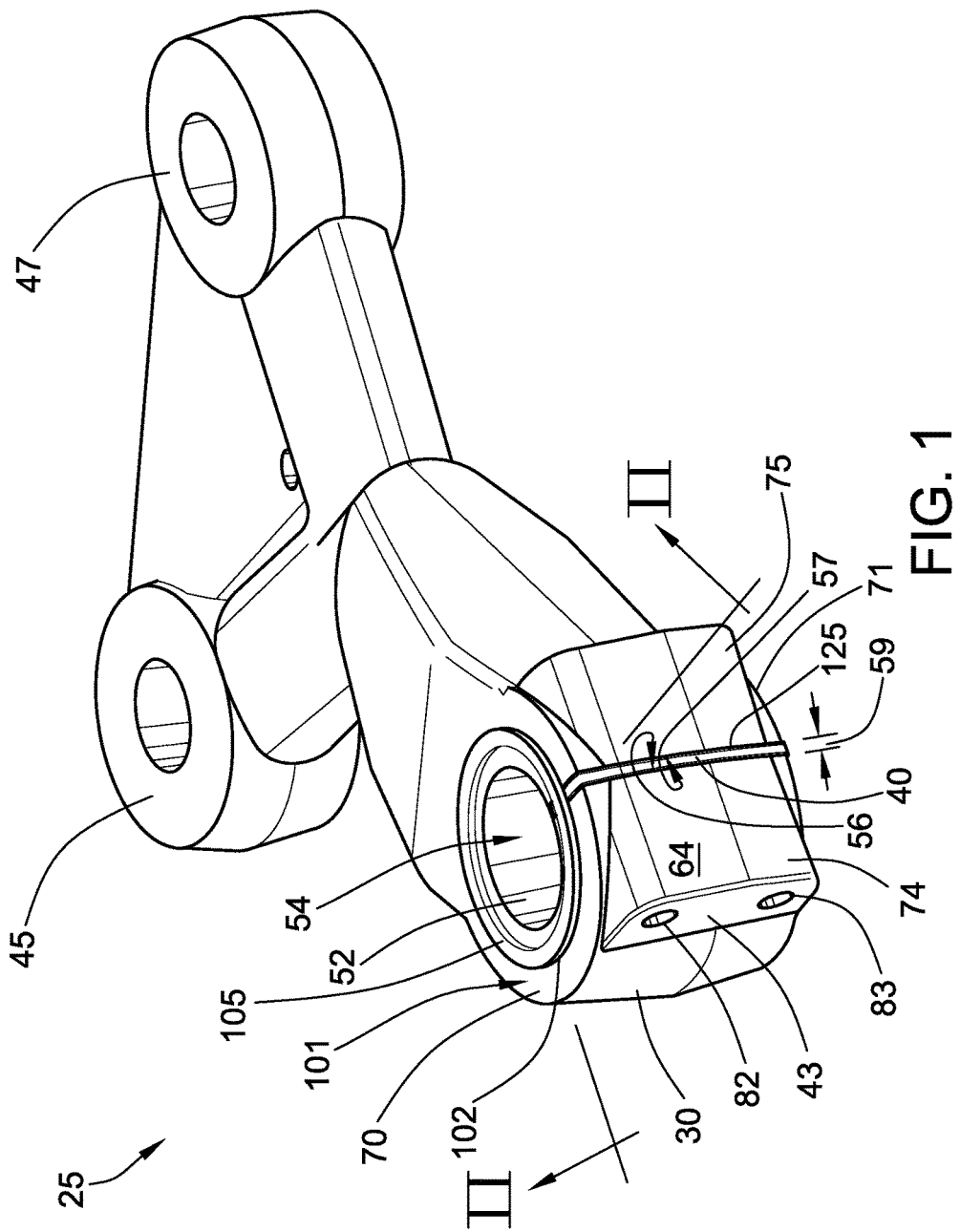
FIG. 1 is a perspective view of an embodiment of a joint assembly constructed according to principles of the present disclosure including a clamp member in the form of a pitman arm and an embodiment of a spacer plate constructed according to principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides embodiments of a joint assembly having a spacer plate with a seal member. In embodiments, a joint assembly constructed in accordance with principles of the present disclosure can be incorporated into any suitable machine. Examples of such machines include mobile or fixed machines used for construction, farming, mining, forestry, transportation, and other similar industries. In some embodiments, the machine can be an off-highway truck, excavator, tractor, wheel loader, backhoe, crane, compactor, dozer, wheel tractor-scraper, material-handling machine, or any other suitable machine which includes a joint assembly.

Embodiments of a joint assembly constructed according to principles of the present disclosure include a clamp member and a spacer plate with a seal member, which can be made from an elastomeric material. The seal member sealingly engages movable jaw surfaces of the clamp member. The movable jaw surfaces are normally disposed in spaced relationship to each other to define a gap therebetween. The spacer plate can be disposed between the jaw surfaces to occlude the gap therebetween. The jaw surfaces can be drawn together such that they exert a compressive load upon the seal member. In response, the seal member acts in the manner of a spring to generate a seal pressure sufficient to sealingly engage the jaw surfaces to help prevent the entry of dirt and debris into the gap.

In embodiments, a spacer plate constructed according to principles of the present disclosure includes a body and a seal member connected to the body. The seal member is disposed adjacent the perimeter of the body and extends partially over a segment of the perimeter of the body. The body is made from a material which is harder than the material from which the seal member is made. In embodiments, the segment of the perimeter of the body over which the seal member extends includes an outer sidewall of the perimeter.

In embodiments, a spacer plate constructed according to principles of the present disclosure includes a body and a seal member connected to the body. The seal member extends over at least a segment of the perimeter of the body. The seal member includes a first bead and a second bead that respectively project from opposing first and second faces of the body. In embodiments, the body is generally planar with the first and second faces of the body being substantially parallel to each other.

In embodiments, the seal member of the spacer plate defines at least one recessed cutout configured to engagingly receive therein a seal ring. In embodiments, the seal ring is made from a material which is harder than the material from which the seal member is made.

Turning now to the FIGURES, there is shown in FIG. 1 an exemplary embodiment of a joint assembly 25 constructed according to principles of the present disclosure. In embodiments, the joint assembly 25 includes a clamp member 30 and an embodiment of a spacer plate 40 constructed according to principles of the present disclosure.

The clamp member 30 is in the form of a pitman arm which includes a yoke 43. The illustrated pitman arm 30 also includes a pair of link ends 45, 47. In other embodiments, the joint assembly 25 can include a clamp member 30 in a different form and/or can be embodied within a different structural component, as will be appreciated by one skilled in the art.

In embodiments, the pitman arm 30 can be used for any suitable purpose, as will be appreciated by one skilled in the art. For example, in embodiments, the pitman arm 30 comprises a steering component in a suitable machine, such as, an off-highway truck, for example. The pitman arm 30 can be used as a linkage in a steering link joint and can be operably arranged with a steering box. In embodiments, the pitman arm 30 can be pivotally mounted to a frame via a pin clamped within the yoke 43 and can be connected with the steering link joint via suitable pins respectively retained within the pair of link ends 45, 47. The pitman arm 30 can transmit angular motion received from the steering box to linear motion to the steering link joint, which in turn adjusts the position of one or more wheels.

Figure 2:
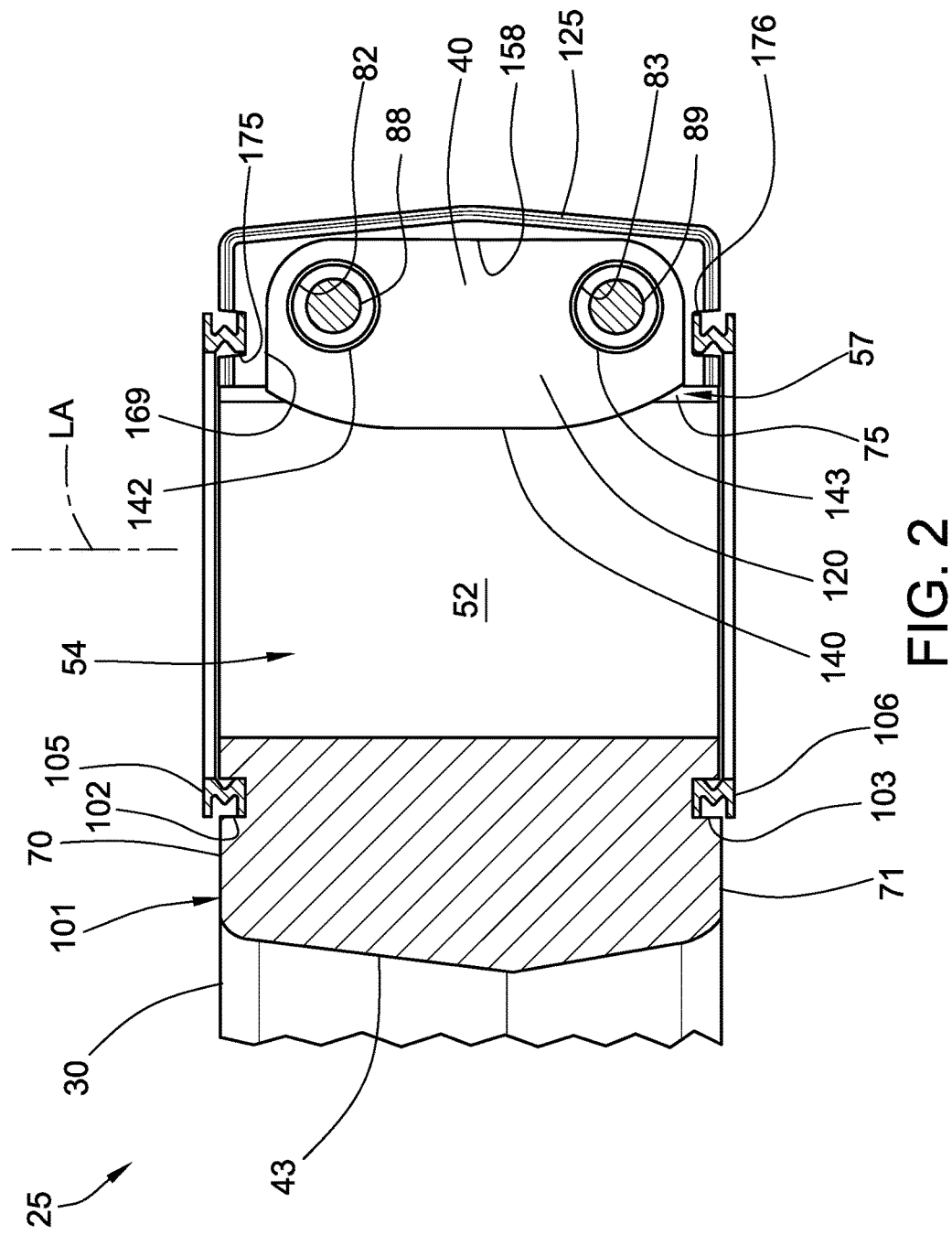
FIG. 2 is an enlarged, detail view, with a radial segment removed as indicated by line II-II in FIG. 1, of a yoke of the pitman arm and illustrating the spacer plate of FIG. 1.

Referring to FIGS. 1 and 2, the clamp member 30 includes an inner cylindrical wall 52 defining a bore 54 extending therethrough. Referring to FIG. 1, the clamp member 30 includes a first jaw surface 56 and a second jaw surface 57 that define a gap 59 therebetween. The first and second jaw surfaces 56, 57 are generally planar and extend radially outwardly from the inner cylindrical wall 52. The gap 59 is in communication with the bore 54 and extends radially outwardly from the bore 54 to an exterior clamp member side surface 64.

Referring to FIGS. 1 and 2, the yoke 43 of the clamp member 30 includes a pair of end collars 70, 71. The bore 54 and the gap 59 both extend axially along a longitudinal axis LA between the pair of end collars 70, 71 such that the end collars 70, 71 are generally C-shaped.

Referring to FIG. 1, the illustrated clamp member 30 comprises the pitman arm yoke 43 which is configured as a C-shaped clamp. The pitman arm yoke 43 includes a first yoke member 74 and a second yoke member 75. The first yoke member 74 and the second yoke member 75 include the first jaw surface 56 and the second jaw surface 57, respectively. The first and second yoke members 74, 75 can be configured as a pair of jaws that can be drawn together to selectively constrict the diameter of the bore 54. In use, the first and second jaw surfaces 56, 57 of the first and second yoke members 74, 75, respectively, can be moved closer together to narrow the gap 59 therebetween and to move the inner cylindrical wall 52 into retentive engagement with a pin 80 disposed within the bore 54 (see FIG. 3).

Referring to FIGS. 1 and 2, in the illustrated embodiment, the first yoke member 74 and the second yoke member 75 each define a pair of mounting bores 82, 83 in respective alignment with the mounting bores 82, 83 of the other yoke member 74, 75. The mounting bores 82, 83 can each be configured to accommodate a suitable fastener for connecting the spacer plate 40 to the clamp member 30 and for drawing the first and second jaw surfaces 56, 57 closer together to narrow the gap 59 therebetween (see FIG. 3).

Figure 3:
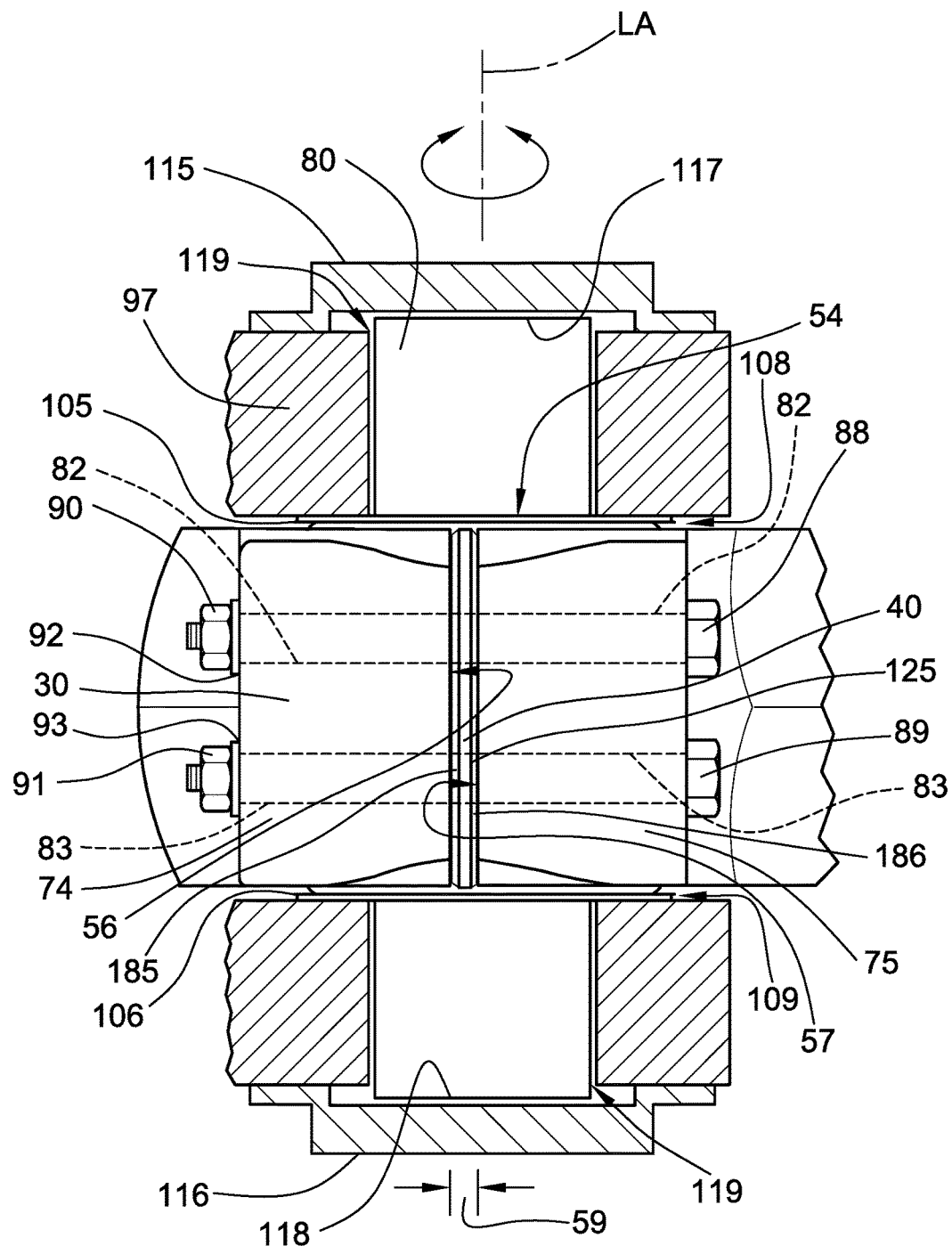
FIG. 3 is an enlarged, detail view, of the yoke of the pitman arm of FIG. 1, illustrating additional components of an embodiment of a joint assembly constructed according to principles of the present disclosure.

In embodiments, any suitable fastener arrangement can be used. For example, in embodiments, the interior of the mounting bores 82, 83 can be smooth and configured as through-holes. Referring to FIG. 3, a respective fastener 88, 89 can extend through the mating mounting bores 82, 83 and be secured to the first and second yoke members 74, 75 via a suitable nut 90, 91 with an internal threaded surface, for example (see FIG. 3). In embodiments, a respective washer 92, 93 can be provided to enhance the mechanical coupling of the fasteners 88, 89 and the first and second yoke members 74, 75. In other embodiments, at least one mating mounting bore 82, 83 can include an internal threaded surface configured to be threadingly engaged with an external threaded surface of a fastener. The threaded fastener can be further threadingly engaged with the internal threaded surface to increasingly draw the first and second jaw surfaces 56, 57 together. In still other embodiments, any suitable technique can be employed to connect the spacer plate 40 to the clamp member 30 and/or to selectively move the first and second jaw surfaces 56, 57 together.

In embodiments, a threaded fastener 88, 89 is engaged with at least one of the first yoke member 74 and the second yoke member 75 such that the threaded fastener 88, 89 is adjustable to decrease the gap 59 between the first jaw surface 56 and the second jaw surface 57 such that the inner cylindrical wall 52 of the clamp member 30 increasingly compressively engages the pin 80 (see FIGS. 1 and 2, as well). In the illustrated embodiments, the threaded fasteners 88, 89 engage the first yoke member 75 via interaction between the threaded fasteners 88, 89 and the nuts 90, 91 and the washers 92, 93 respectively mounted thereto. The threaded fasteners 88, 89 directly engage the second yoke member 75 by virtue of their interfering engagement therewith.

The pin 80 is disposed within the bore 54 of the clamp member 30 and is in retentive engagement with the inner cylindrical wall 52 of the clamp member 30 to connect the pin 80 and the clamp member 30 together (see FIG. 1 also). The pin 80 and the clamp member 30 are rotatively coupled. The pin 80 can be pivotally mounted to a frame 97 such that the pin 80 and the clamp member 30 are pivotally movable relative to the frame 97 about the longitudinal axis LA. In embodiments, the pin 80 and the clamp member 30 are rotatably movable about the longitudinal axis LA relative to the frame 97 over an angular range of travel. In embodiments, the pin 80 can oscillate about the longitudinal axis LA relative to the frame 97 over an angular range of travel of about one hundred degrees. In embodiments, the frame 97 can be secured to the chassis of the machine in which the joint assembly 25 is used. In embodiments, the frame 97 can include any suitable structure for pivotally mounting the pin 80 thereto. In embodiments, a bushing and/or thrust ring can be radially interposed between the pin 80 and the frame 97 to facilitate the relative rotational movement of the pin 80.

Referring to FIGS. 1 and 2, in embodiments, the clamp member 30 includes an exterior clamp member surface 101 that defines an annular groove 102 circumscribing the bore 54 of the clamp member 30. In the illustrated embodiment, each of the end collars 70, 71 defines a respective annular groove 102, 103, each being configured to accept therein a respective seal ring 105, 106 (see FIG. 2).

Referring to FIGS. 2 and 3, the seal rings 105, 106 are annular and are respectively disposed within the annular grooves 102, 103 of the clamp member 30. The seal rings 105, 106 are configured to provide a running seal between the clamp member 30 and the frame 97. Referring to FIG. 3, the seal rings 105, 106 are configured to sealingly engage the frame 97 and the end collars 70, 71, respectively, to provide a radial seal for the bore 54 of the clamp member 30. The seal rings 105, 106 can help prevent dirt and debris from entering the bore 54 radially through axial clearance paths 108, 109 which can be defined between the clamp member 30 and the frame 97. The seal rings 105, 106 can accommodate the relative rotational movement of the clamp member 30 about the longitudinal axis LA relative to the frame 97 while maintaining sealing contact therewith.

In embodiments, the seal rings 105, 106 can be made from any suitable seal ring material, such as a suitable urethane, for example. In embodiments, the seal rings 105, 106 can have any suitable size and shape. Each seal ring 105, 106 of the embodiment illustrated in FIGS. 1-3 has a generally W-shaped transverse cross-sectional shape, when in the unloaded—or uncompressed—condition, as shown in FIG. 2, substantially continuously around its entire circumference circumscribed around the longitudinal axis LA. In other embodiments, the seal rings 105, 106 can have a different cross-sectional shape. In still other embodiments, the seal rings 105, 106 can have shapes that are different from each other.

The seal rings 105, 106 can be placed in compressive contact with both the clamp member 30 and the frame 97 during the assembly of the pin 80 to the frame 97. The seal rings 105, 106 apply contact pressure between the clamp member 30 and the frame 97 substantially uniformly distributed over the circumference of each seal ring 105, 106. In embodiments, the seal rings 105, 106 apply contact pressure to the clamp member 30 and the frame 97 to provide a seal therebetween over a range of intended operating conditions.

Referring to FIG. 3, in embodiments, a cap or end cover 115, 116 can be provided to seal each axial end 117, 118 of the pin 80. The caps 115, 116 can be configured to prevent dirt and debris from entering axially through a radial entry path 119 defined between the pin 80 and the interior of the frame 97. In embodiments, the caps 115, 116 can be secured to the frame 97 via any suitable technique, as will be appreciated by one skilled in the art. For example, the caps 115, 116 can be connected to the frame via fasteners, welding, or adhesive, for example.

Referring to FIG. 3, according to an aspect of the present disclosure, an embodiment of a spacer plate 40 constructed according to principles of the present disclosure can be provided to further protect the pin 80 from the deteriorative effects of dirt and debris becoming trapped against the pin 80. The spacer plate 40 can help provide an enhanced seal for the pin 80. The spacer plate 40 is connected to the clamp member 30 such that the spacer plate 40 is disposed within the gap 59 between the first jaw surface 56 and the second jaw surface 57. The spacer plate 40 is configured to sealingly engage both the first and second jaw surfaces 56, 57 to seal the gap 59 therebetween to help prevent the entry of dirt and debris through the gap 59 into the bore 54, thereby helping to reduce the wear of the pin 80.

Figure 4:
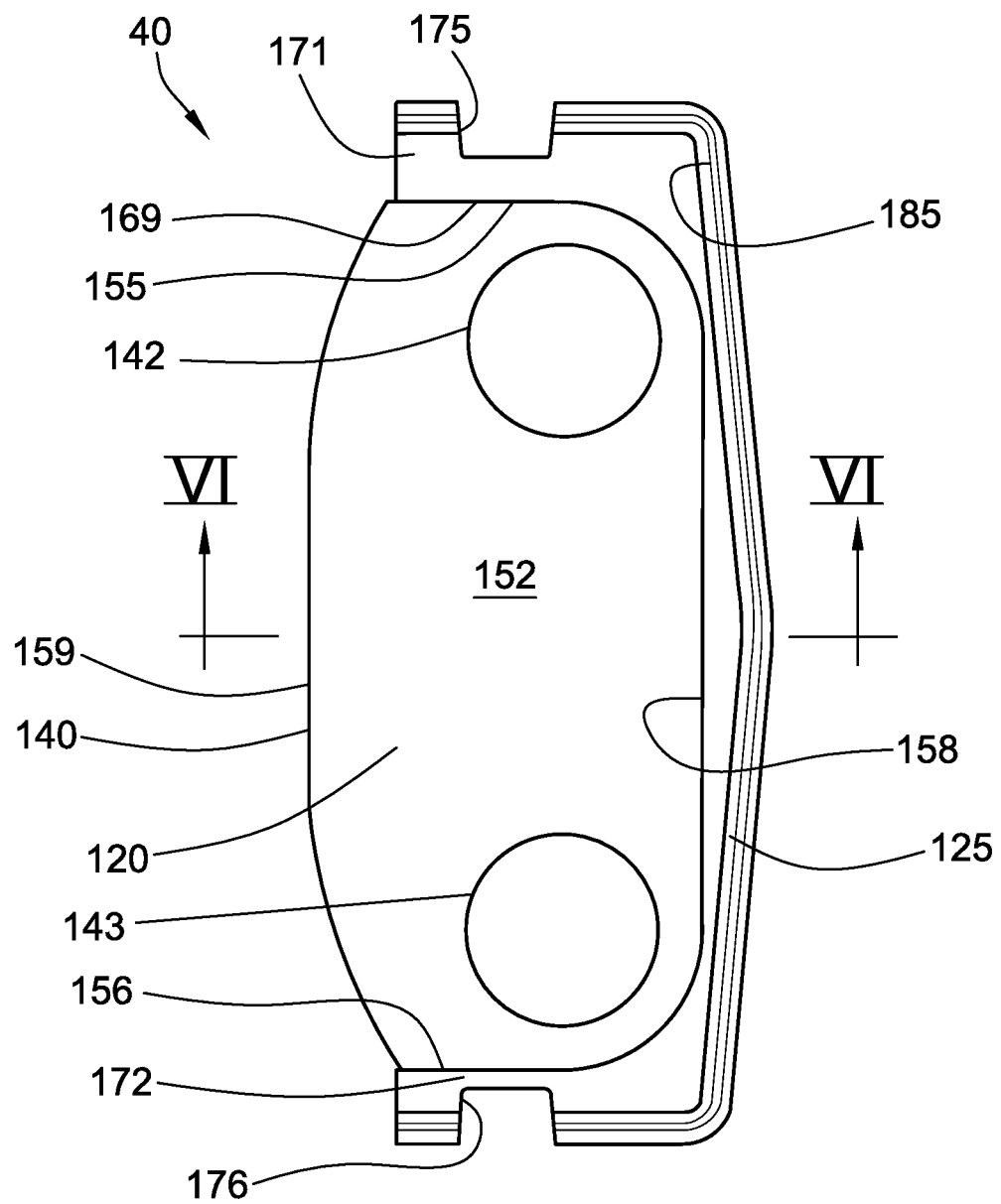
FIG. 4 is an elevational view of the spacer plate of FIG. 1.

Referring to FIGS. 2 and 4, the spacer plate 40 includes a body 120 and a seal member 125. The seal member 125 is connected to the body 120. In the embodiment of FIGS. 2 and 4, the seal member 125 is connected to the body 120 such that the seal member 125 is disposed adjacent a perimeter 140 of the body. In embodiments, the seal member 125 can be connected to the body 120 via any suitable technique, such as, by being bonded thereto with an adhesive, by being mechanically joined together via a locking arrangement of the body 120 and the seal member 125, or a combination thereof, for example.

The body 120 can be made from any suitable body material, such as metal, including steel, for example, or a thermoplastic polymer, including acrylonitrile butadiene styrene (ABS), for example. The seal member 125 can be made from any suitable seal member material. In embodiments, the seal member 125 is made from a seal member material comprising an elastomer, such as natural rubber, for example. In embodiments, the body material is harder than the seal member material.

In embodiments, the body 120 of the spacer plate 40 defines a mounting hole 142 extending therethrough. In the illustrated embodiment, the body 120 defines a pair of mounting holes 142, 143 therethrough. The threaded fasteners 88, 89 are disposed within the mounting bores 82, 83 of the first yoke member 74 and the second yoke member 75 and the mounting holes 142, 143 of the spacer plate 40 (see FIGS. 2 and 3). The mounting holes 142, 143 are respectively aligned with the mating mounting bores 82, 83 of both the first yoke member 74 and the second yoke member 75. The mounting holes 142, 143 of the body 120 respectively correspond to the size and location of the mating mounting bores 82, 83 of the first and second yoke members 74, 75 of the clamp member 30. In embodiments, the mounting holes 142, 143 of the body 120 can be slightly larger than the mating mounting bores 82, 83, respectively, to accommodate variations in the location of the spacer plate 40 relative to the first and second yoke members 74, 75 and to facilitate drawing the first and second yoke members 74, 75 together without unduly flexing the fasteners 88, 89.

Referring to FIGS. 4, 6, 8, and 9, the body 120 includes a first face 152 and a second face 153. The second face 153 is in opposing relationship to the first face 152. In the illustrated embodiment, the body 120 is substantially planar. The first face 152 and the second face 153 of the body 120 are substantially planar and are substantially parallel to each other.

Figure 9:
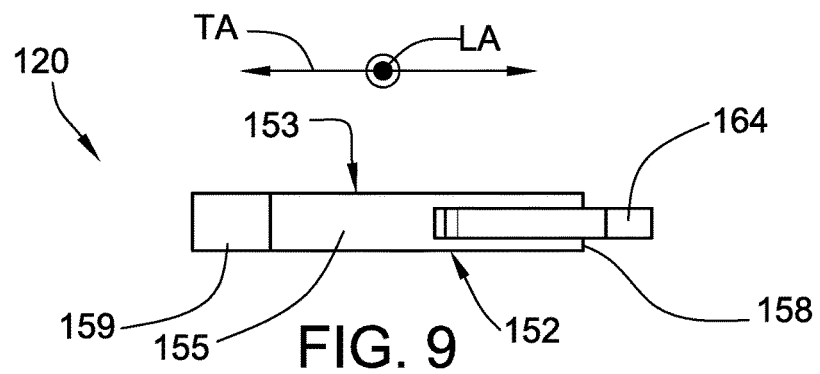
FIG. 9 is a plan view of the body of FIG. 8.
Figure 8:
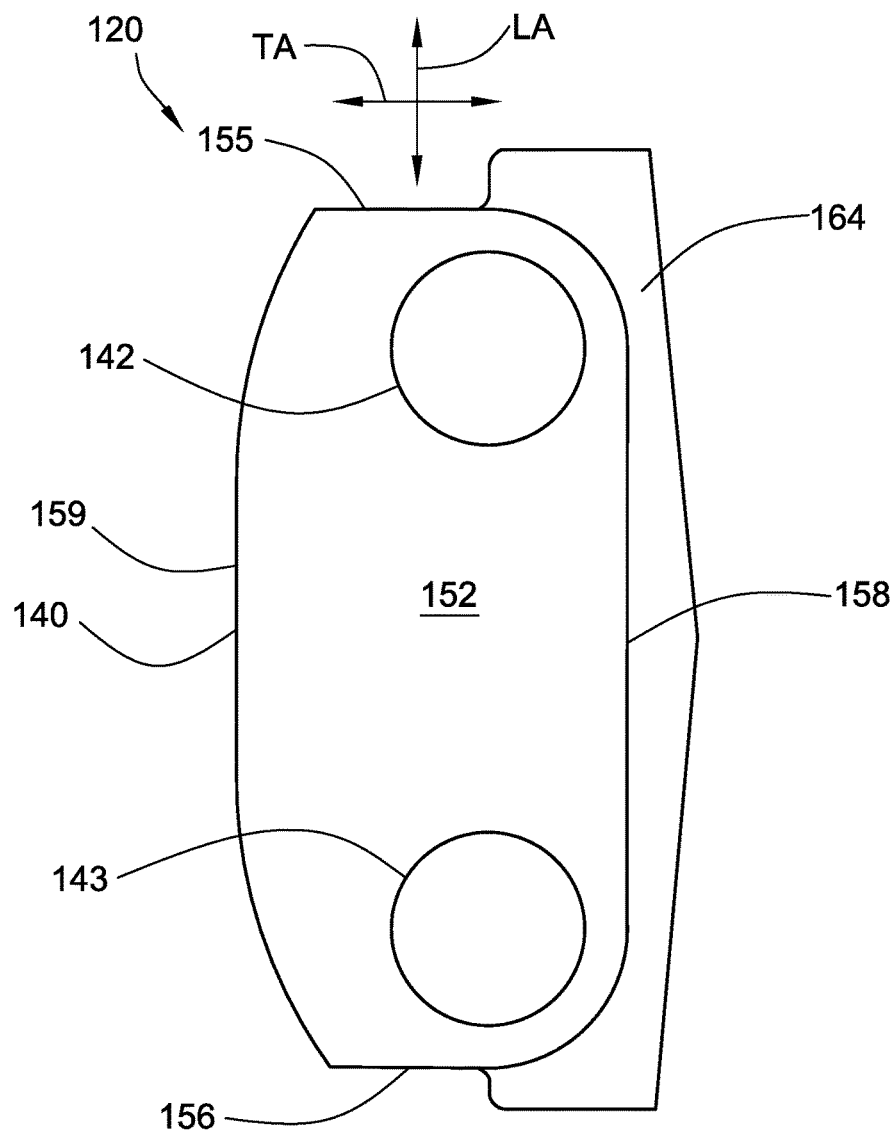
FIG. 8 is an elevational view of a body of the spacer plate of FIG. 1.

Referring to FIGS. 8 and 9, the perimeter 140 of the body 120 includes a first end 155, a second end 156, a first sidewall 158, and a second sidewall 159. The first end 155 and the second end 156 are in spaced longitudinal relationship to each other along a longitudinal axis LA defined by the body 120. The first sidewall 158 and the second sidewall 159 are in spaced lateral relationship to each other along a transverse axis TA, which is perpendicular to the longitudinal axis LA. The first sidewall 158 and the second sidewall 159 both extend longitudinally between the first end 155 and the second end 156.

In embodiments, the body 120 can include a spline 164 that is configured to facilitate the connection of the seal member 125 to the body 120. The spline 164 can provide an increased surface area for bonding the seal member 125 to the body 120 and can help provide structural support for the seal member 125. In the illustrated embodiment, the spline 164 projects from the first sidewall 158 and the first and second ends 155, 156 of the perimeter 140 of the body 120. In the joint assembly 25 of FIGS. 1 and 2, the first sidewall 158 comprises an outer sidewall.

Referring to FIG. 4, the seal member 125 is connected to the body 120 such that the seal member 125 is adjacent the perimeter 140. In embodiments, the seal member 125 extends over at least a segment 169 of the perimeter 140 of the body. The illustrated seal member 125 partially extends over the perimeter 140 of the body 120. In embodiments, the segment 169 of the perimeter 140 over which the seal member 125 extends includes the first end 155, the second end 156, and one of the first sidewall 158 and the second sidewall 159. The illustrated segment 169 of the perimeter 140 over which the seal member 125 extends includes the first end 155, the second end 156, and the first sidewall 158, with the first sidewall 158 comprising an outer sidewall.

Figure 5:
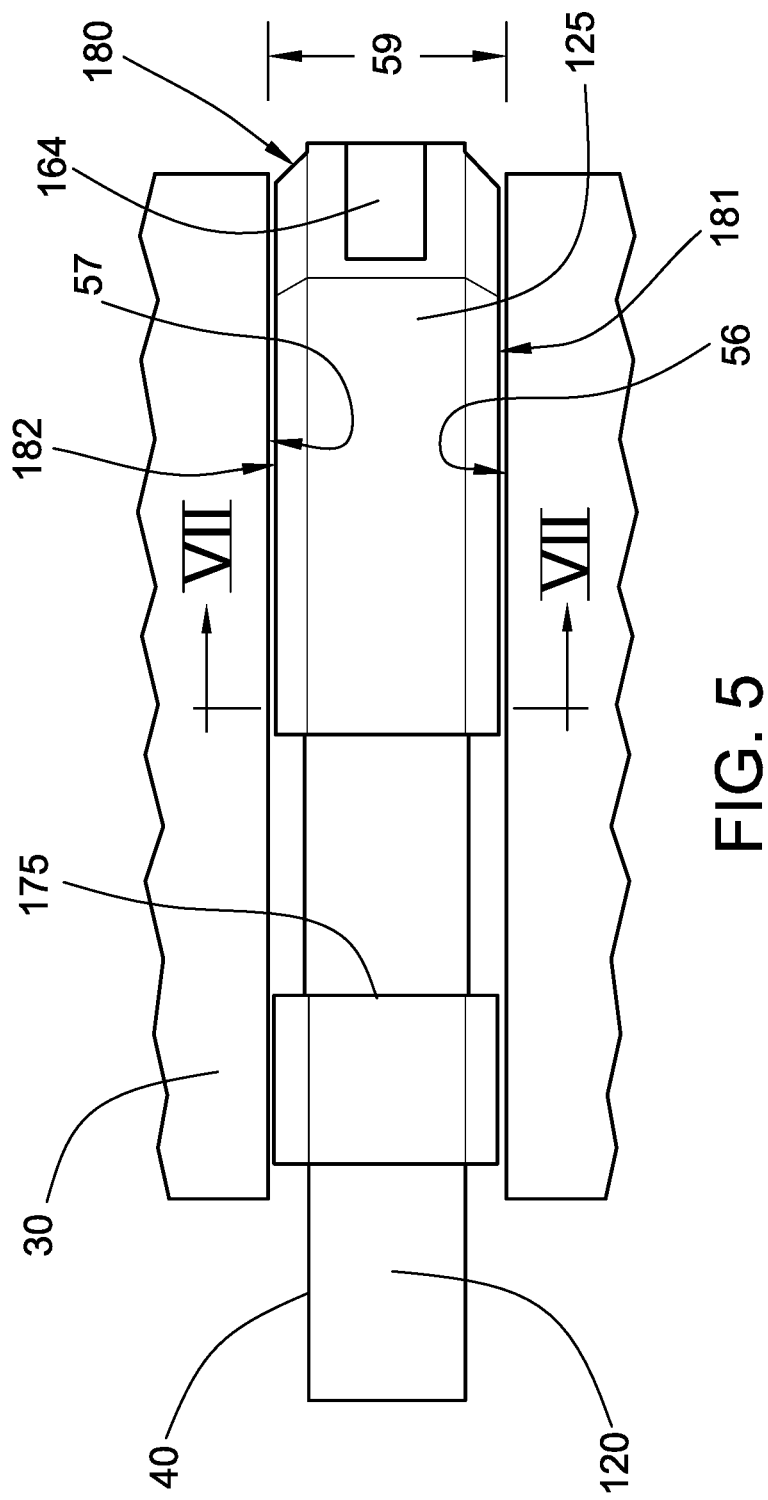
FIG. 5 is a plan view of the spacer plate of FIG. 1.

In the illustrated embodiment, the seal member 125 is connected to the body 120 such that the spline 164 is embedded within the seal member 125 (see FIG. 5 also). In the illustrated embodiment, a portion of the spline 164 along the first sidewall is exposed. An adhesive can be applied to the exterior surface of the spline 164 to enhance the bonded connection between the seal member 125 and the body 120. In the illustrated embodiment, the segment 169 of the perimeter 140 over which the seal member 125 extends is larger than the spline 164 such that a pair of terminal portions 171, 172 of the seal member 125 is respectively connected to the first and second ends 155, 156 of the perimeter 140 of the body 120 without the spline 164 being interposed therebetween.

Referring to FIGS. 1 and 3, the seal member 125 is in sealing engagement with the first jaw surface 56 and the second jaw surface 57. Referring to FIGS. 1 and 2, in embodiments, the segment 169 of the perimeter 140 over which the seal member 125 extends is configured to occlude the gap 59 radially along the pair of end collars 70, 71 and axially along the longitudinal axis LA between the pair of end collars 70, 71. In embodiments, the seal member 125 is configured to have a shape and size that substantially corresponds to the exterior clamp member side surface 64 and to the first and second end collars 70, 71 to provide a substantially flush appearance when the spacer plate is installed within the gap 59 between the first and second jaw surfaces 56, 57.

Referring to FIG. 4, in embodiments, the seal member 125 defines at least one recessed cutout 175 configured to accommodate therein one of the seal rings 105, 106. The seal member 125 can project outwardly from the perimeter 140 such that the recessed cutout 175 is outwardly displaced from the perimeter 140 of the body 120. In embodiments, the recessed cutout 175 is disposed along one of the first end 155 and the second end 156 of the perimeter 140. In other embodiments, the seal member 125 does not include a recessed cutout.

In the illustrated embodiment, the seal member 125 defines a first recessed cutout 175 and a second recessed cutout 176. The first recessed cutout 175 and the second recessed cutout 176 are disposed respectively along the first end 155 and the second end 156 of the perimeter 140. In the illustrated embodiments, the first recessed cutout 175 and the second recessed cutout 176 are disposed respectively within the first terminal portion 171 and the second terminal portion 172 of the seal member 125. The seal member 125 projects outwardly from the perimeter 140 such that the first and second recessed cutouts 175, 176 are outwardly displaced from the first and second end 155, 156 of the perimeter 140 of the body 120.

Referring to FIGS. 1 and 2, the first and second recessed cutouts 175, 176 of the seal member 125 are radially aligned with the annular grooves 102, 103 of the clamp member 30 when the spacer plate 40 is installed within the gap 59 between the first and second jaw surfaces 56, 57. Referring to FIG. 2, the first and second seal rings 105, 106 are respectively disposed within the first and second recessed cutouts 175, 176. The first and second seal rings 105, 106 are respectively disposed within the annular grooves 102, 103 of the clamp member 30 and respectively extend through the first and second recessed cutouts 175, 176 of the seal member 125.

The first and second seal rings 105, 106 can be placed in compressive engagement with the seal member 125. In embodiments, the first and second seal rings 105, 106 are in sealing engagement with the seal member 125 within the first and second recessed cutouts 175, 176, respectively. In embodiments, the seal rings 105, 106 can be made from a seal ring material that is harder than the seal member material from which the seal member 125 is made. For example, in embodiments, the seal rings 105, 106 can be made from a seal ring material comprising a urethane having a hardness of about 55 Shore D, and the seal member 125 of the spacer plate 40 is made from a seal member material comprising an elastomer (such as, natural rubber, for example) having a hardness of about 70 Shore A.

Figure 6:
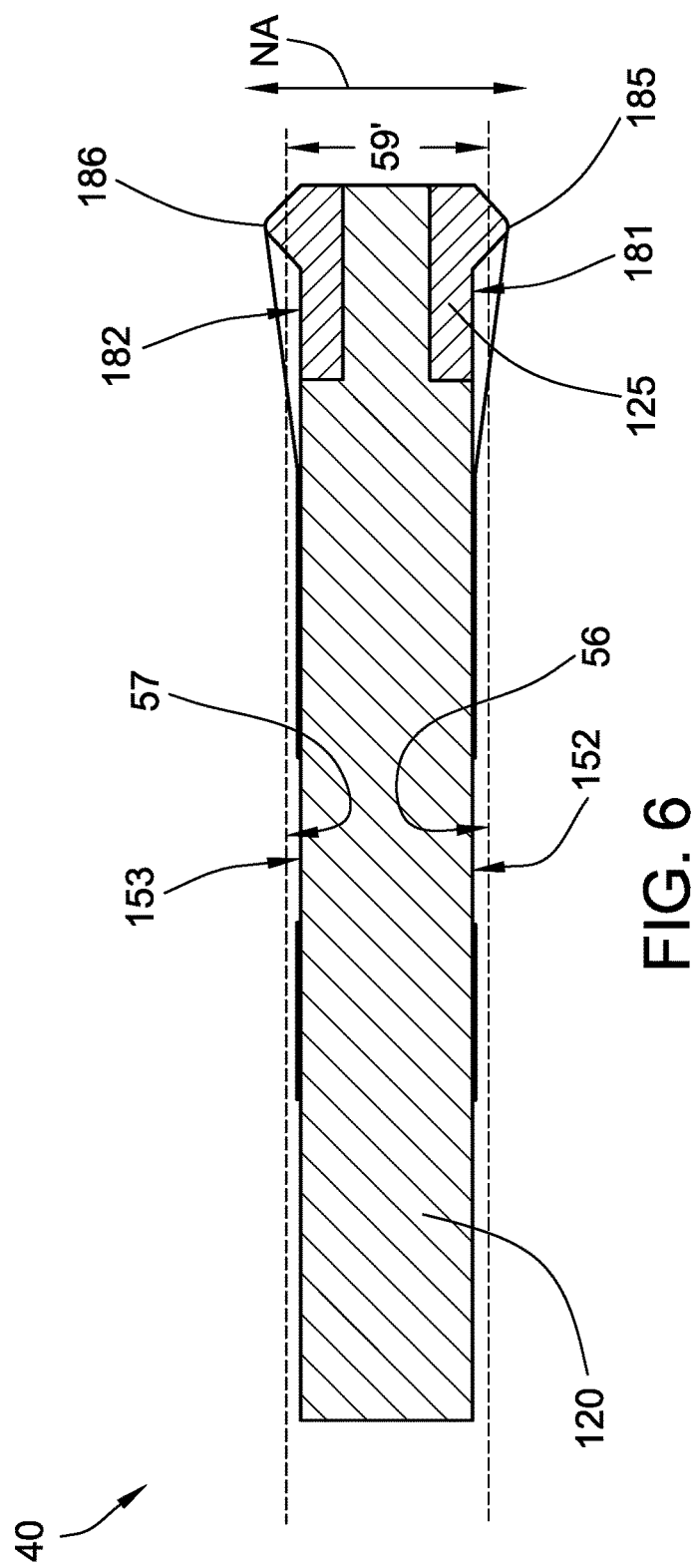
FIG. 6 is a cross-sectional view of the spacer plate of FIG. 1 taken along line VI-VI in FIG. 4.

Referring to FIGS. 5 and 6, the seal member 125 includes an exterior seal member surface 180 having a first sealing face surface 181 and a second sealing face surface 182. The first sealing face surface 181 and the second sealing face surface 182 can be placed in sealing engagement with the first jaw surface 56 and the second jaw surface 57 of the clamp member 30.

The jaw surfaces 56, 57 can be drawn together to narrow the gap 59 between them to a narrower gap 59' such that they exert a compressive load upon the seal member 125 (see FIG. 6). In response, the seal member 125 acts in the manner of a spring to generate a seal pressure sufficient to sealingly engage the first and second jaw surfaces 56, 57 to help prevent the entry of dirt and debris into the gap 59'.

In embodiments, the first and second sealing face surfaces 181, 182 of the seal member 125 undergo a substantially uniform deformation to generate a sufficient, substantially continuous contact pressure with the first and second jaw surfaces 56, 57, respectively. In embodiments, the first and second sealing face surfaces 181, 182 of the seal member 125 generate a uniform and sufficient sealing pressure along the seal member 125 to provide a seal against dirt and debris entering the gap 59'. In embodiments, the seal member 125 maintains substantially continuous contact/sealing pressure along the seal member 125 that is relatively stable since it is a static seal and the seal member 125 remains in a compressed condition when the first and second jaw surfaces 56, 57 define the narrower gap 59'.

Referring to FIG. 5, the exterior seal member surface 180 defines the first recessed cutout 175, which extends between the first sealing face surface 181 and the second sealing face surface 182 thereof. The exterior seal member surface 180 defines the second recessed cutout 176 in a similar manner such that it also extends between the first and second sealing face surfaces 181, 182.

Figure 7:
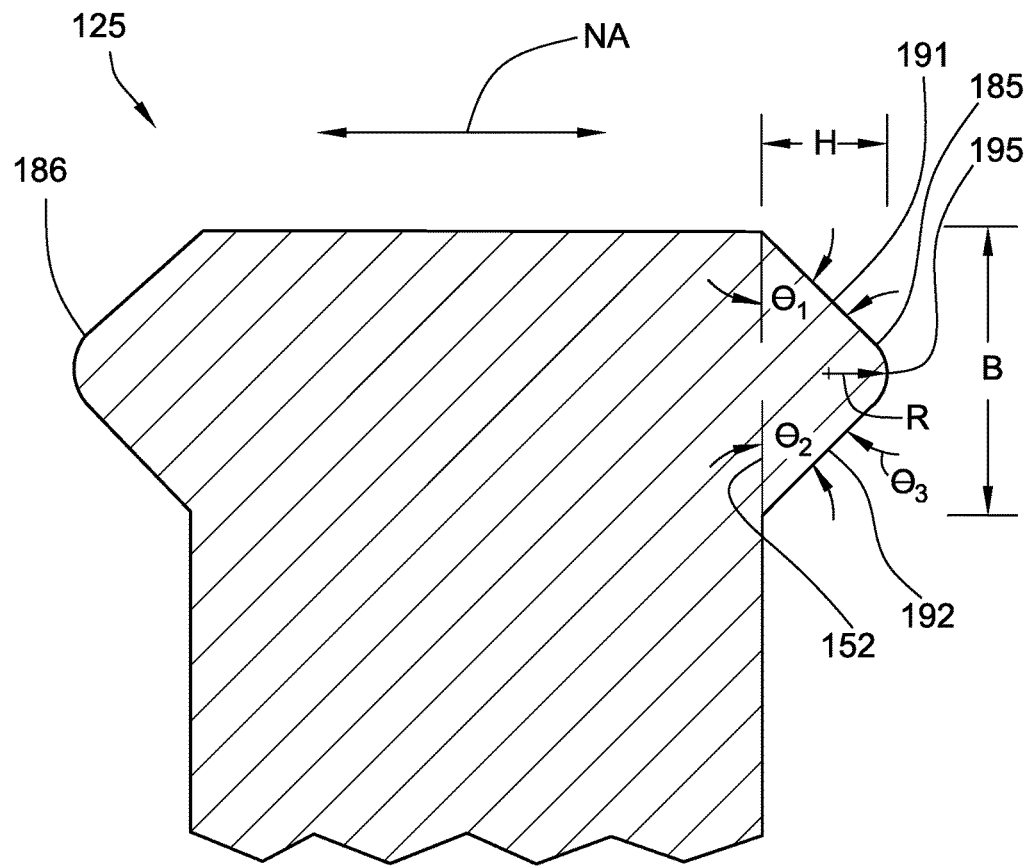
FIG. 7 is an enlarged, detail cross-sectional view of the spacer plate of FIG. 1 taken along line VII-VII in FIG. 5, illustrating a seal member of the spacer plate.

Referring to FIGS. 4, 6, and 7, in embodiments, the seal member includes a pair of beads 185, 186 extending partially around the perimeter 140 of the body 120 of the spacer plate 40. In the illustrated seal member 125, the first bead 185 and the second bead 186 respectively project from the first face 152 and the second face 153 of the body 120. In the illustrated embodiment, the first and second sealing face surfaces 181, 182 are substantially identical. Accordingly, it will be understood that the description of one of the first and second sealing face surfaces 181, 182 is applicable to the other, as well.

Referring to FIG. 4, the first bead 185 extends over the axial length of the seal member 125 and is substantially coextensive with the seal member 125 over the segment 169 of the perimeter 140 over which the seal member 125 extends (except at the first and second recessed cutouts 175, 176). In other embodiments, the seal member 125 is substantially free of recessed cutouts, and the first and second beads 185, 186 (see FIGS. 4-6) extend over the entire axial length of the seal member 125. Referring to FIG. 6, in the illustrated embodiment, the first bead 185 and the second bead 186 respectively project from the first face 152 and the second face 153 of the body 120 along a normal axis NA, which is perpendicular to the first face 152 and the second face 153.

Referring to FIG. 7, the first bead 185 has a triangular cross-sectional shape when in an unloaded—or uncompressed—condition substantially continuously along its entire axial length. In embodiments, the first bead 185 can have a transverse cross-sectional shape which comprises an equilateral triangle. In other embodiments, the transverse cross-sectional shape of the first bead 185 can be an isosceles triangle, such as is illustrated in FIG. 7. In still other embodiments, the first bead 185 can have a transverse cross-sectional shape which has a different triangular shape. In yet other embodiments, the first bead 185 can have a transverse cross-sectional shape which is different from a triangle. The description of the first bead 185 is applicable to second bead 186, as well.

The first bead 185 includes a pair of converging bevel surfaces 191, 192. The pair of converging bevel surfaces 191, 192 defines, respectively, a first bevel angle $\theta_1$ and a second bevel angle $\theta_2$ with respect to the first face 152 of the body. In other embodiments, each of the first bevel angle $\theta_1$ and the second bevel angle $\theta_2$ is in a range between twenty-five degrees and sixty-five degrees. In still other embodiments, each of the first bevel angle $\theta_1$ and the second bevel angle $\theta_2$ is in a range between thirty degrees and sixty degrees, and in a range between thirty degrees and fifty degrees in yet other embodiments. In other embodiments, each of the first bevel angle $\theta_1$ and the second bevel angle $\theta_2$ is in a range between thirty degrees and forty-five degrees.

In the illustrated embodiment, the first bevel angle $\theta_1$ and the second bevel angle $\theta_2$ are substantially equal to each other such that the first bead 185 has a transverse cross-sectional shape which comprises an isosceles triangle. The illustrated first and second bevel angles $\theta_1$, $\theta_2$ are both forty-five degrees. In other embodiments, the first bevel angle $\theta_1$, the second bevel angle $\theta_2$, and an apex angle $\theta_3$ are substantially equal to each other such that the first bead 185 has a transverse cross-sectional shape which comprises an equilateral triangle.

The first bead 185 projects from the first face 152 along the normal axis NA to an apex 195 by a height H. The first bead 185 has a width B measured between the converging bevel surface 191, 192 at the first face 152. The illustrated apex 195 is rounded and has a radius of curvature R. One or more of the bevel angles $\theta_1$, $\theta_2$ can be varied by changing the height H and or the width B of the first bead 185. In embodiments, the width B, the height H and/or the radius of curvature R of the apex 195 can be varied to adjust the contact sealing pressure generated by the first bead 185 when it is compressed by the clamp member 30. In embodiments, the first and second jaw surfaces 56, 57 are drawn closer together to narrow the gap 59 with the seal member 125 of the spacer plate 40 disposed therebetween such that the contact/sealing pressure generated by the first and second beads 185, 186 is equal to or greater than 1 MPa substantially over the axial length of the first and second beads 185, 186 along the segment 169 of the perimeter 140 over which the seal member 125 extends (see FIG. 2 also).

Figure 10:
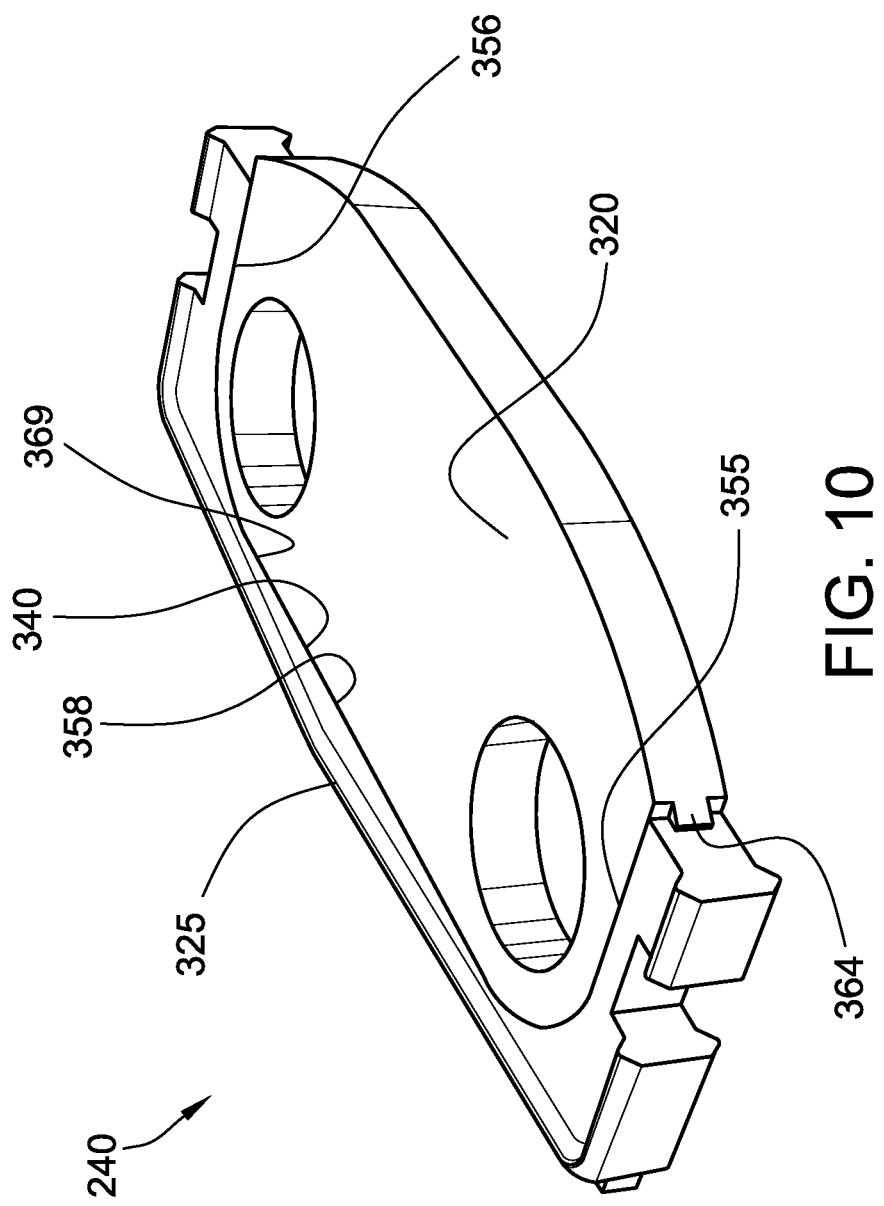
FIG. 10 is a perspective view of another embodiment of a spacer plate constructed according to principles of the present disclosure.

Referring to FIG. 10, another embodiment of a spacer plate 240 constructed according to principles of the present disclosure is shown therein. The spacer plate 240 is suitable for use in embodiments of a joint assembly constructed according to principles of the present disclosure, such as is shown in FIG. 1.

The spacer plate 240 includes a body 320 and a seal member 325. The seal member 325 is connected to the body 320 such that the seal member 325 is disposed adjacent a perimeter 340 of the body 320. In the illustrated embodiment of FIG. 10, the seal member 325 is connected to the body 320 by being bonded thereto. In addition, the body includes a spline 364 that is configured to facilitate the connection of the seal member 325 to the body 320. The spline 364 can provide an increased surface area for bonding the seal member 325 to the body 320 and can help provide structural support for the seal member 325. In the illustrated embodiment, the spline 364 projects from the first sidewall 358 and the first and second ends 355, 356 of the perimeter 340 of the body 320. In the illustrated embodiment, the segment 369 of the perimeter 340 over which the seal member 325 extends is slightly smaller than the spline 364 such that the spline 164 is substantially continuously interposed between the seal member 325 and the body 320 over the entire axial length of the seal member 325. The spacer plate 240 of FIG. 10 can be similar in other respects to the spacer plate 40 of FIGS. 1-9.

INDUSTRIAL APPLICABILITY

The industrial applicability of the embodiments of a joint assembly and a spacer plate described herein will be readily appreciated from the foregoing discussion. At least one embodiment of a spacer plate constructed according to principles of the present disclosure can be used in a machine to help maintain a seal within a joint assembly. Embodiments of a joint assembly according to principles of the present disclosure may find potential application in any suitable machine, such as an off-highway truck, for example.

Embodiments of a joint assembly constructed according to principles of the present disclosure include a clamp member and a spacer plate with a seal member, which can be made from an elastomeric material. The seal member sealingly engages movable jaw surfaces of the clamp member. The movable jaw surfaces are normally disposed in spaced relationship to each other to define a gap therebetween. The spacer plate can be disposed within the gap to occlude the gap therebetween. The jaw surfaces can be drawn together such that they exert a compressive load upon the seal member. In response, the seal member acts in the manner of a spring to generate a seal pressure sufficient to sealingly engage the jaw surfaces to help prevent the entry of dirt and debris into the gap.

In embodiments, a spacer plate constructed according to principles of the present disclosure includes a body and a seal member connected to the body. In embodiments, the seal member is disposed adjacent the perimeter of the body and extends partially over a segment of the perimeter of the body. The body is made from a material which is harder than the material from which the seal member is made. In embodiments, the seal member extends over at least a segment of the perimeter of the body and includes a first bead and a second bead that respectively project from opposing first and second faces of the body. In embodiments, the seal member is in the form of a bead extending partially around a perimeter of a body of the spacer plate.

Embodiments of a joint assembly constructed according to principles of the present disclosure can be considered a "maintenance-free" joint in that they do not require lubrication. The joint assembly can avoid the need to use grease/lubrication during use yet maintain its functionality. A spacer plate constructed according to principles of the present disclosure can prevent the infiltration of dirt and debris through the gap between jaw surfaces of a clamp member. As a result, the additional cost requirement for using and periodically applying grease to the joint assembly can be avoided. For example, in a typical off-highway truck application, a joint assembly may be greased twice a day during intended use of the machine, resulting in increased material costs and decreased run time each day for each joint of the machine requiring such lubrication.

In embodiments, the clamp member comprises a yoke of a pitman arm which is outfitted with a spacer plate constructed according to principles of the present disclosure. The spacer plate, which acts as a shim, is inserted between jaw surfaces of the yoke which define a gap therebetween. The seal member is positioned on the body such that the seal member is in sealing engagement with the yoke when the jaw surfaces of the yoke are brought together (such as by the use of a threaded fastener therethrough). The jaw surfaces can be drawn closer together such that the seal member is in sealing engagement with both jaw surfaces of the yoke to occlude an outer entry path into the gap. The jaw surfaces exert a compressive load upon the seal member, and, in response, the seal member acts in the manner of a spring to generate a seal pressure sufficient to sealingly engage the jaw surfaces to prevent the entry of dirt and debris through the gap to the pin.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A spacer plate comprising:
a body, the body including a perimeter and a spline, the spline projecting from the perimeter of the body, the body being made from a body material;
a seal member, the seal member including a pair of terminal portions, the seal member connected to the body such that the spline is embedded within the seal member, the seal member disposed adjacent the perimeter of the body, the seal member partially extending over a segment of the perimeter of the body such that the pair of terminal portions are in non-contacting relationship with each other, the seal member being made from a seal member material, the body material being harder than the seal member material;

wherein the perimeter of the body includes a first end, a second end, a first sidewall and a second sidewall the first end and the second end in spaced longitudinal relationship to each other along a longitudinal axis defined by the body, the first sidewall and the second sidewall in spaced lateral relationship to each other along a transverse axis perpendicular to the longitudinal axis, the first sidewall and the second sidewall both extending longitudinally between the first end and the second end;

wherein the spline projects from the first end, the second end, and one of the first sidewall and the second sidewall; and wherein the segment of the perimeter over which the seal member extends includes the first end, the second end, and only said one of the first sidewall and the second sidewall, such that the other of the first sidewall and the second sidewall is free of any seal member material.

2. The spacer plate according to claim 1, wherein the seal member includes an exterior seal member surface having a first sealing face surface and a second sealing face surface, the exterior seal member surface defining a recessed cutout extending between the first sealing face surface and the second sealing face surface.

3. The spacer plate according to claim 2, wherein the seal member projects outwardly from the perimeter such that the recessed cutout is outwardly displaced from the perimeter of the body.

4. The spacer plate according to claim 1, wherein the seal member includes an exterior seal member surface having a first sealing face surface and a second sealing face surface, the exterior seal member surface defining a recessed cutout extending between the first sealing face surface and the second sealing face surface of the exterior seal member surface, the recessed cutout disposed along one of the first end and the second end of the perimeter, the seal member projecting outwardly from the perimeter such that the recessed cutout is outwardly displaced from said one of the first end and the second end of the perimeter of the body.

5. The spacer plate according to claim 4, wherein the recessed cutout comprises a first recessed cutout, and wherein the exterior seal member surface defines a second recessed cutout extending between the first sealing face surface and the second sealing face surface, the first recessed cutout and the second recessed cutout disposed respectively along the first end and the second end of the perimeter, the seal member projecting outwardly from the perimeter such that the first recessed cutout is outwardly displaced from the first end of the perimeter of the body and the second recessed cutout is outwardly displaced from the second end of the perimeter of the body, and wherein the segment of the perimeter over which the seal member extends is larger than the spline such that the pair of terminal portions of the seal member is respectively connected to the first end and the second end of the perimeter of the body without the spline being interposed therebetween.

6. The spacer plate according to claim 1, wherein the body includes a first face and a second face, the second face in opposing relationship to the first face, and wherein the seal member includes a first bead and a second bead, the first bead and the second bead respectively projecting from the first face and the second face of the body.

7. The spacer plate according to claim 6, wherein the first face and the second face of the body are substantially planar, the first bead and the second bead respectively projecting from the first face and the second face of the body along a normal axis, the normal axis being perpendicular to the first face and the second face.

8. The spacer plate according to claim 7, wherein the first bead has a triangular cross-sectional shape, the first bead including a pair of converging bevel surfaces.

9. The spacer plate according to claim 8, wherein the pair of converging bevel surfaces defines, respectively, a first bevel angle and a second bevel angle with respect to the first face.

10. The spacer plate according to claim 9, wherein the first bevel angle and the second bevel angle are substantially equal to each other.

11. The spacer plate according to claim 9, wherein the first bevel angle and the second bevel angle are both in a range between twenty-five degrees and sixty-five degrees.

12. The spacer plate according to claim 11, wherein the first bevel angle and the second bevel angle are substantially equal to each other.

13. A joint assembly comprising:
a clamp member, the clamp member including a first jaw surface and a second jaw surface, the first jaw surface and the second jaw surface defining a gap therebetween;
a spacer plate, the spacer plate connected to the clamp member such that the spacer plate is disposed within the gap between the first jaw surface and the second jaw surface, the spacer plate including:
a body, the body including a perimeter and a spline, the spline projecting from the perimeter of the body, the body being made from a body material, and
a seal member, the seal member including a pair of terminal portions, the seal member connected to the body such that the spline is embedded within the seal member, the seal member disposed adjacent the perimeter of the body, the seal member extending over a segment of the perimeter of the body such that the pair of terminal portions are in non-contacting relationship with each other, the seal member being made from a seal member material, the body material being harder than the seal member material, and the seal member in sealing engagement with the first jaw surface and the second jaw surface,
wherein the perimeter of the body includes a first end, a second end, a first sidewall and a second sidewall the first end and the second end in spaced longitudinal relationship to each other along a longitudinal axis defined by the body, the first sidewall and the second sidewall in spaced lateral relationship to each other along a transverse axis perpendicular to the longitudinal axis, the first sidewall and the second sidewall both extending longitudinally between the first end and the second end,
wherein the spline projects from the first end, the second end, and one of the first sidewall and the second sidewall, and
wherein the segment of the perimeter over which the seal member extends includes the first end, the second end, and only said one of the first sidewall and the second sidewall, such that the other of the first sidewall and the second sidewall is free of any seal member material.

14. The joint assembly according to claim 13, wherein the clamp member includes an inner cylindrical wall defining a bore extending therethrough, the gap in communication with the bore and extending radially outwardly therefrom, the joint assembly further comprising:

a pin, the pin disposed within the bore of the clamp member and in retentive engagement with the inner cylindrical wall of the clamp member to connect the pin and the clamp member together.

15. The joint assembly according to claim 14, wherein the clamp member includes a first yoke member and a second yoke member, the first yoke member and the second yoke member including the first jaw surface and the second jaw surface, respectively, the first yoke member and the second yoke member each defining a mounting bore in alignment with each other, and wherein the body of the spacer plate defines a mounting hole extending therethrough, the mounting hole aligned with the mounting bore of both the first yoke member and the second yoke member, the joint assembly further comprising:

a threaded fastener, the threaded fastener disposed within the mounting bore of the first yoke member and the second yoke member and the mounting hole of the spacer plate, the threaded fastener engaged with at least one of the first yoke member and the second yoke member such that the threaded fastener is adjustable to decrease the gap between the first jaw surface and the second jaw surface such that the inner cylindrical wall of the clamp member increasingly compressively engages the pin.

16. The joint assembly according to claim 14, wherein the clamp member includes a pair of end collars, the bore and the gap both extending axially between the pair of end collars, and wherein the segment of the perimeter over which the seal member extends is configured to occlude the gap radially along the pair of end collars and axially between the pair of end collars.

17. The joint assembly according to claim 14, wherein the clamp member includes an exterior clamp member surface, the exterior clamp member surface defining an annular groove circumscribing the bore of the clamp member, and wherein the seal member includes an exterior seal member surface having a first sealing face surface and a second sealing face surface, the first sealing face surface and the second sealing face surface in sealing engagement with the first jaw surface and the second jaw surface of the clamp member, respectively, the exterior seal member surface defining a recessed cutout extending between the first sealing face surface and the second sealing face surface, the recessed cutout of the seal member being radially aligned with the annular groove of the clamp member, the joint assembly further comprising:

a seal ring, the seal ring disposed within the annular groove of the clamp member and extending through the recessed cutout of the seal member.

18. The joint assembly according to claim 17, wherein the seal ring is made from a seal ring material, and the seal member is made from a seal member material, the seal ring material being harder than the seal member material.

* * * * *